April 26, 1960   H. W. PATNODE   2,934,263
ELECTROMECHANICAL SCANNING APPARATUS
Filed Dec. 27, 1956

INVENTOR.
HOMER W. PATNODE
BY
HIS ATTORNEY

United States Patent Office 2,934,263
Patented Apr. 26, 1960

1

2,934,263

ELECTROMECHANICAL SCANNING APPARATUS

Homer W. Patnode, Gibsonia, Pa., assignor to Gulf Research & Development Company, Pittsburgh, Pa., a corporation of Delaware Application December 27, 1956, Serial No. 630,903

13 Claims. (Cl. 235—61.6)

This invention relates to a method of and apparatus for summarizing the azimuthal distribution of a narrow, elongated, electrically conductive portion of an otherwise nonelectrically conductive surface, and more particularly pertains to a method of and apparatus for summarizing the azimuthal distribution of a plurality of electrically conductive lines on an otherwise nonelectrically conductive surface.

Practice of the invention affords information of considerable interpretive value in connection with the analysis of any phenomenon that can be represented on a surface area by lines, the directions of which lines are characteristic of the phenomenon by summarizing the azimuthal distribution of the lines. Such analytical information can be of value in many fields on endeavor. For example, in the fields of the geologist and mineralogist, practice of the invention can be of value in summarizing the azimuthal distribution of the stream components of a stream drainage pattern; in summarizing the azimuthal distribution of natural lineaments observed on aerial photographs of the earth's surface (fault lines, strata exposure, etc.); in determining the orientation of the long axis of mineral grains in a rock as observed in a thin section of such rock.

With respect to the first-mentioned use of the preceding paragraph, azimuthal summarizations of stream drainage patterns can contribute substantially to an understanding of the morphology of an area under investigation, such as, for example, with respect to earth fractures, isopleths, and the like.

Broadly, the method of the invention can be practiced for the purpose of summarizing the azimuthal distribution of an elongated and relatively narrow, electrically conductive zone of a surface otherwise not electrically conductive by providing a pair of electrodes spaced farther apart than the width of the conductive zone, moving the electrodes in contact with the surface along a travel path substantially normal to the spacing of the electrodes to scan substantially uniformly the entire area of the surface while maintaining a constant azimuthal orientation of the electrodes, and recording the total number of separate occurrences of the electrodes being electrically bridged or connected by the electrically conductive zone.

These and other aspects of the invention will become evident in the light of the following detailed description of a preferred mode of practicing the invention, together with a description of a preferred apparatus embodiment of the invention illustrated in the accompanying drawings, wherein.

2

Figure 1:
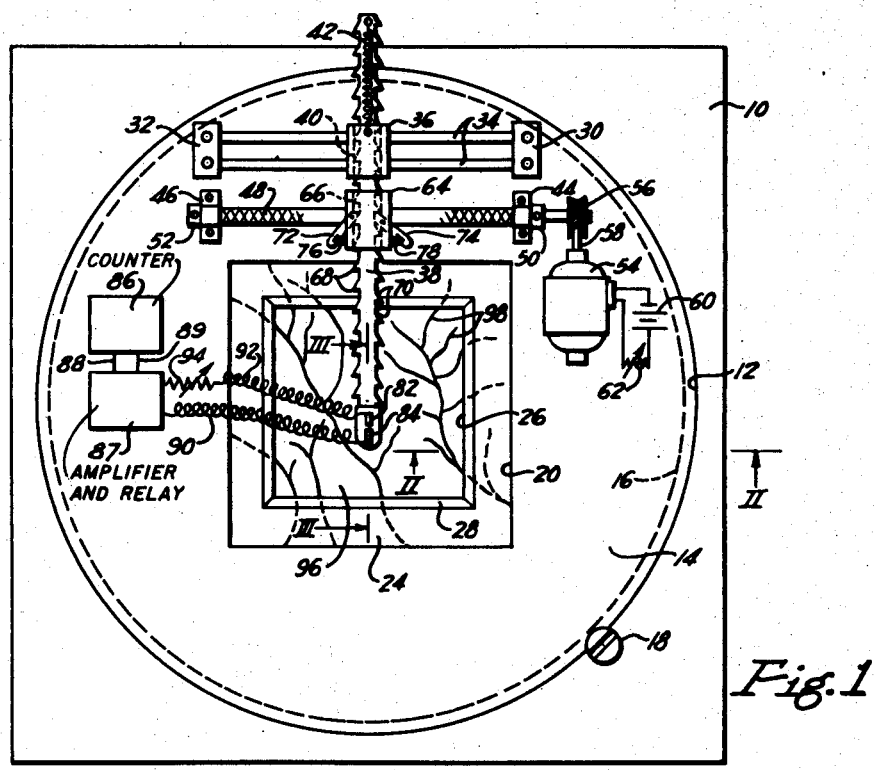
Figure 1 is a top plan view of the scanning and summarizing apparatus, certain hidden details thereof being indicated by dashed lines.
Figure 2:
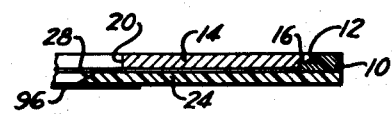
Figure 2 is a fragmentary vertical-horizontal sectional view taken upon the plane of the section line II—II of Figure 1.

Referring to Figures 1 and 2, the numeral 10 designates a horizontally disposed rectangular base plate having a circular shouldered opening 12 therethrough. A horizontally disposed, substantially flat scanning plate 14 having a shouldered circular periphery 16 is rotatably positioned within the opening 12 in the base plate 10 with the shouldered parts of the plates 10 and 14 being in engagement, as best shown in Figure 2. The base plate 10 is provided with a locking screw 18, the head portion of which overlaps the outer periphery of the scanning plate 14, as shown in Figure 1, whereby the scanning plate 14 can be secured in a selected angular relation with respect to the base plate 10.

The scanning plate 14 is provided with a central polygonal opening 20, preferably square as shown. As best shown in Figure 2, the base plate 10 rests on a plate or mask 24, the upper surface of the latter being coplanar with the lower surface of the plate 10 and spaced below the lower surface of the scanning plate 14. The plate or mask 24 is of electrically non-conductive material that is preferably transparent, such as glass or a clear plastic (polymerized methyl methacrylate—a resin plastic sold under the trademark "Lucite" is suitable). The plates 24 and 10 are secured together in any suitable manner, such as by an adhesive or recessed fastening screws, not shown. Alternatively, the plates 10 and 24 can be of integral construction of an electrically nonconductive and preferably transparent material such as "Lucite."

The plate 24 is provided with a central opening 26, which is preferably polygonal such as the especially preferred square configuration shown. The upper surface of the portion of the plate 24 bordering the opening 26 is beveled as shown at 28. The opening 26 is at least sufficiently smaller than the opening 20 in the plate 14 that the plate 14 never overlies any part of the opening 26 during rotation of the plate 14 relative to the plates 10 and 24.

A pair of support standards 30 and 32 are mounted upon the scanning plate 14, and a pair of horizontally disposed, parallel guide rods 34 extend between the standards 30 and 32 is spaced relation above the plate 14 and have their extremities secured to the standards 30 and 32.

A carrier block 36 is slidably mounted upon the guide rods 34, the same being provided with openings, not shown, which slidably receive the rods 34 therethrough for this purpose. A carrier arm 38 slidably extends through an opening 40 in the carrier block 36 for longitudinal reciprocation in a direction perpendicular to the guide rods 34, the arrangement being such that when the carrier block 36 is midway between the support standards 30 and 32, the carrier arm 38 projects horizontally above the plates 14 and 24 towards the center of the opening 26. A tension spring 42 has its opposite extremities secured to the carrier block 36 and the end of the carrier arm 38 remote from the center of the opening 26, as shown, so as to yieldingly urge longitudinal movement of the carrier arm 38 towards the opening 26.

Means is provided for causing reciprocating movement of the carrier block 36 along its travel path defined by the guide rods 34. A pair of bearing members 44 and 46 is mounted on the plate 14, and a shaft 48 with a reversing lead screw such as the level wind shaft conventionally used in level winding fishing reels is journaled in the bearing members 44 and 46, the shaft 48 being spaced above the plate 14 and parallel to the guide rods 34, as shown.

Collars 50 and 52 are fixed to the shaft 48 to prevent endwise movement of the same. The shaft 48 is rotated at a selected speed by an arrangement comprising a direct-current electric motor 54 mounted upon the plate 14, such motor 54 being drivingly connected to the shaft 48 by worm gear means which includes a worm 56 and the shaft 58 of the motor 54. The electric motor 54 is energized by an electric circuit which includes a voltage supply such as battery 60 and variable rheostat 62 mounted upon the plate 14 whereby the speed of the motor 54 and consequently the speed of rotation of the shaft 48 are adjustably controlled.

The numeral 64 designates a traveling block which includes a conventional follower or tracking element, not shown, that is operatively connected to the shaft 48 in the usual manner, the arrangement being that customarily employed in level winding fishing reels, and is such that unidirectional rotation of the shaft 48 will cause the traveling block 64 to reciprocate along the length of the shaft 48 with the speed of the traveling block 64 being directly proportional to the rotational speed of the shaft 48.

The traveling block 64 is provided with an opening 66 therethrough, through which the carrier arm 48 slidably extends. Opposite sides of the carrier arm 38 are provided with sets of ratchet teeth 68 and 70 with the teeth of each of such sets being alternated along the length of the carrier arm 38 with the teeth of the other set. The carrier block 64 is provided with a pair of pivoted pawls 72 and 74 for cooperation with the sets of ratchet teeth 68 and 70, respectively. The pawls 72 and 74 are respectively provided with compression springs 76 and 78 that urge their respective pawls towards their associated sets of ratchet teeth 68 and 70. The pawls 72 and 74 normally project outwardly from opposite sides of the traveling block 64, as shown, so that the exposed extremities thereof are disposed in a position to engage the bearing members 46 and 44, respectively, upon the traveling block 64 closely approaching the limiting positions of the reciprocating movement of the traveling block 64. Such engagement of a pawl with a bearing member causes the pawl to be pivoted from engagement with its respective set of ratchet teeth as the traveling block 64 reaches a limiting position of its reciprocating movement, and allows the carrier arm 38 to advance until stopped by the other pawl engaging one of the other set of ratchet teeth.

From the foregoing, it will be seen that during rotation of the shaft 48, the traveling block 64 is caused to reciprocate, with the carrier arm 38 and the carrier block 36 participating in such reciprocating motion by virtue of the sliding extension of the carrier arm 38 through the openings 66 and 40 in the traveling block 64 and the carrier block 36. At each limiting position of the reciprocation of the carrier arm 38, whichever one of the pawls 72 and 74 that is restraining or preventing movement of the carrier arm 38 as urged by the spring 42 is released so that the carrier arm 38 is permitted to advance until the other pawl is engaging a ratchet tooth on the arm 38. In other words, each time the carrier arm 38 reaches a limiting position in its reciprocation, the same is advanced towards the opening 26 by one-half the distance that the teeth of one of the sets of ratchet teeth 68 and 70 are spaced apart.

Figure 3:
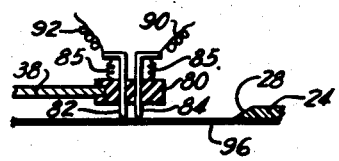
Figure 3 is an enlarged fragmentary sectional detail view of the electrode construction, the same being taken upon the plane of the section line III—III of Figure 1.

Referring to Figures 1 and 3, it will be seen that the carrier arm 38 includes a substantially rigid end portion 80 formed of an electrical insulating material, such as hard rubber or a thermosetting plastic, the same being attached to the metallic portion of the carrier arm 38 by a tongue and groove joint as shown. A pair of L-shaped electrodes 82 and 84 slidably extend vertically through a pair of openings in the portion 80 of the arm 38, the electrodes being yieldingly urged downwardly by tension springs 85, as shown. The electrodes are spaced longitudinally of the carrier arm 38 and are preferably spaced apart in an interval substantially equal to the distance that the carrier arm is advanced longitudinally each time that one of the pawls 72 or 74 is depressed upon engagement with one of the bearing members 46 or 44, respectively.

Means is provided for counting each occurrence of the pair of electrodes 82 and 84 being bridged or connected by an electrical conductor. Such means comprises a conventional electromechanical counting device 86 mounted on the plate 14. The counting device 86 can conveniently be a Mercury #MDA-S4 counter (manufactured by Production Instrument Company, Chicago, Illinois). The counting device 86 is driven by a conventional electronic circuitry adapted for high sensitivity and responsiveness to low current input. Such a means for driving the counting device 86 can conveniently comprise an amplifier and relay assembly 87 mounted on the plate 14, the output of which is connected to the counting device 86 by leads 88 and 89. The electrode 84 is connected to the assembly 87 by a lead 90 and the electrode 82 is connected to the assembly 87 by a lead 92 through an adjustable resistance 94 mounted on the plate 14 that can conveniently be a conventional plug type resistance box which affords selection of one of a plurality of precision high ohmic resistances. The leads 90 and 92 are insulated and are preferably formed of resilient or spring-like material and are loosely coiled, as shown, to afford sufficient slack so as to allow for free movement of the electrodes 82 and 84. If desired, the leads 88 and 90 can be supported by a mast, not shown, on the plate 14, so as to support the leads 88 and 90 above the plate 14. Conventional means, not shown, are provided for energizing the counting device 86 and the assembly 87.

The operation of the means for counting each occurrence of the pair of electrodes 82 and 84 being bridged will be readily appreciated by those skilled in the art. The electrodes 82 and 84 are electrically biased from the assembly 87, so that upon the electrodes 82 and 84 being bridge by a conductor, a direct-electric current flows through the leads 90 and 92 having a magnitude dependent upon the resistance value of the conductor bridging the electrodes 82 and 84 and the setting of the adjustable resistance 94. Such direct current is amplified linearly by the assembly 87, with the amplified current causing actuation of the relay of the assembly 87 to energize or provide a pulse of current to the counting device 86 through the leads 88 and 89, whenever the amplified current exceeds a value fixed by the characteristics of the relay of the assembly 87. Each individual occurrence of actuation of the relay and consequent energization or providing a pulse of current to the counting device 86 causes the latter to register an additional count.

It will be noted that the adjustable resistance 94 affords a means to limit the minimum resistance of a conductor bridging the electrodes 82 and 84 that will result in actuation of the relay of the assembly 87 and operation of the counting device 86.

The operation of the apparatus in connection with summarizing the azimuthal distribution of stream components of a stream drainage pattern will now be described. A map or representation is prepared of the stream drainage pattern under investigation such that the representation of stream drainage courses is comprised of electrically conductive lines on a relatively non-electrically conductive surface. Such a map can conveniently be made of a sheet of ordinary paper that is substantially nonelectrically conductive with the stream drainage pattern being represented thereon by continuous lines drawn with or printed with a conventional electrically conductive ink. Alternatively, such lines can be drawn with an ordinary "lead pencil" as the marking element thereof includes graphite, an electrically conductive substance. A map prepared in the latter manner is shown in Figure 1 underlying the previously described apparatus. The sheet of substantially nonconductive paper being indicated at 96 and the electrically conductive lines being indicated at 98. The apparatus shown in Figure 1 is positioned on the map with the particular portion of the map to be analyzed being in registry with the opening 26, it being noted that the transparency of the plate 24 facilitates proper orientation of the apparatus on the map by making visible portions of the map outside that which is exposed through the opening 26. The carrier arm 38 is moved against the action of the spring 42 until the electrodes are in contact with the surface of the plate 24 adjacent the traveling block 64, it being observed that the pawls 72 and 74 allow the carrier arm 38 to freely ratchet to such a position. The electric motor 54 is then caused to rotate at the desired speed by appropriate control of the rheostat 62. The carrier arm 38 will then be caused to reciprocate laterally and advance longitudinally by incremental steps in such a manner that the electrodes 82 and 84 will scan the entire surface of the map exposed through the opening 26.

It will be noted that the distance of the later reciprocation of the carrier arm 38 is such that the electrodes 82 and 84 never touch but closely approach the edges of the plate 14 at the opposite sides of the opening 20. During the scanning operation, the lower extremities of the electrodes 82 and 84 pass over and in contact with the surface of the map comprised of the paper 96 and the lines 98 thereon, and also travel over the upper surface of the plate 24 inasmuch as the edges of the plate 24 are beveled as indicated at 28 and inasmuch as the electrodes 82 and 84 can move upwards against the action of the springs 85. When the electrodes 82 and 84 are spaced an interval equal to the length of an individual incremental advance of the carrier arm 38, the electrode 82 will travel along a path in one direction which the electrode 84 traveled in the previous movement of the electrodes in the opposite direction.

During the scanning of the portion of the map exposed through the opening 26, it will be evident that the electrodes 82 and 84 can be bridged or connected by substantially solely only such portions of the electrically conductive lines 98 as extend substantially parallel to the spacing of the electrodes 82 and 84. Consequently, the number of individual occurrences of the bridging of the electrodes 82 and 84 by the lines 98 is a measure of the extent to which the lines 98 have direction components substantially parallel to the spacing of the electrodes 82 and 84. The total number of such occurrences during the scanning of the entire surface of the map exposed through the opening 26 is counted by the counting device 86, as the latter is actuated upon each occurrence of a flow of current through the leads 90 and 92, it being noted that such a flow of current will occur upon the bridging of the electrodes 82 and 84 by a component of the lines 98.

After the portion of the map exposed through the opening 26 has been scanned and the total number of counts indicated by the counter 86 recorded, the screw 18 can be loosened and the scanning plate 14 rotated within the base plate 10 to a different azimuthal position and the above-described scanning and counting procedure repeated so as to obtain an indication of the azimuthal distribution of the lines 98 with respect to the changed azimuth of the scanning plate 14. This operation can be repeated as few or as many times as desired. As the plate 24 is secured to the plate 10, the area of the map scanned in each azimuthal position of the plate 14 remains unchanged as the plate or mask 24 does not rotate. Counting values obtained with respect to a single area of the map with different azimuthal settings of the plate 14 can be compared to indicate the azimuthal distribution of the lines 98 for such single area of the map. The procedure can then be repeated with respect to adjacent areas of the map.

From the description given previously of the counting means and particularly the function of the adjustable resistance 94, it will be understood that the resistance 94 can be adjusted to a value chosen such that the electrical resistance of lines 98 bridging the electrodes 82 and 84 must be less than a selected value or the occurrence of such bridging will not be counted. This is of value as the resistance of a component of the lines 98 is substantially proportional to the length of such line component, and therefore the counting device 86 can be made effectively insensitive to a bridging of the electrodes 82 and 84 by a line 98 when the portion of the line 98 bridging the electrodes has a length substantially greater than the spacing of the electrodes.

From the foregoing, it will be evident to those skilled in the art that the subject invention is susceptible to numerous variations from the described preferred forms thereof without departing from the spirit of the invention. For example, portions of the lines 98 can be omitted in the immediate vicinity of junctures of lines such as indicate the confluence of streams, so that such junctures cannot be included in a bridging of the electrodes 82 and 84 by the lines 98. Also, retractable roller carriage means or guide means, not shown, can be provided for the base plate 10 whereby the scanning apparatus can be readily translated from one position to another over the surface of a map so as to successively expose different portions of the map for scanning through the opening 26.

Though the preferred embodiments of the invention have been described in very considerable detail, it is not to be implied therefrom any narrowness of scope of the invention, as such detail is given only to convey a full and complete understanding of the principles of the invention. The actual scope of the invention is to be ascertained upon reference to the appended claims.

I claim:

1. Apparatus for scanning a surface comprising a pair of vertical, horizontally spaced electrodes adapted to travel over and to contact a surface, a carrier for said electrodes, said electrodes depending from said carrier, means for horizontally reciprocating said carrier in a direction normal to the spacing of the electrodes between first and second limiting positions, means effective upon each occurrence of the carrier reaching one of said limiting positions to advance the carrier a fixed unidirectional horizontal distance parallel to the spacing of the electrodes, electrical means connected to the electrodes for counting individual occurrences of the electrodes being connected by an electrical conductor.

2. The combination of claim 1, wherein said fixed distance is not more than approximately the spacing of the electrodes.

3. Apparatus for scanning a surface comprising a pair of vertical, horizontally spaced electrodes adapted to travel over and to contact a surface, a carrier for said electrodes, said electrodes depending from said carrier, means for horizontally reciprocating said carrier in a direction normal to the spacing of the electrodes between first and second limiting positions, means effective upon each occurrence of the carrier reaching one of said limiting positions to advance the carrier a fixed unidirectional horizontal distance parallel to the spacing of the electrodes, electrical means connected to the electrodes for counting individual occurrences of the electrodes being connected by an electrical conductor having a resistance less than a set value.

4. Apparatus for scanning a surface comprising a pair of vertical, horizontally spaced electrodes adapted to travel over and to contact a surface, a carrier for said electrodes, said electrodes depending from said carrier, means including a shaft having a reversing lead screw for horizontally reciprocating said carrier in a direction normal to the spacing of the electrodes between first and second limiting positions, means effective upon each occurrence of the carrier reaching one of said limiting positions to advance the carrier a fixed unidirectional horizontal distance parallel to the spacing of the electrodes, electrical means connected to the electrodes for counting individual occurrences of the electrodes being connected by an electrical conductor.

5. Apparatus for scanning a surface comprising a pair of vertical, horizontally spaced electrodes adapted to travel over and to contact a surface, a carrier for said electrodes, said electrodes depending from said carrier, means for horizontally reciprocating said carrier in a direction normal to the spacing of the electrodes between first and second limiting positions, ratchet and pawl means effective upon each occurrence of the carrier reaching one of said limiting positions to advance the carrier a fixed unidirectional horizontal distance parallel to the spacing of the electrodes, electrical means connected to the electrodes for counting individual occurrences of the electrodes being connected by an electrical conductor.

6. Apparatus for scanning a surface comprising a horizontal, substantially flat plate having an opening therethrough, a carrier supported upon the plate and projecting horizontally over the opening, a pair of depending, horizontally spaced electrodes carried by the carrier, means for horizontally reciprocating the carrier in a direction normal to the spacing of the electrodes between first and second limiting positions adjacent opposite sides of the opening, and means effective upon each occurrence of the carrier reaching one of the limiting positions to advance the carrier horizontally a fixed distance in one direction that is parallel to the spacing of the electrodes, and means for detecting each occurrence of electrodes being connected by an electric conductor.

7. The combination of claim 6, including electrically nonconductive masking means disposed below the plate for limiting the area of a surface engageable by the electrodes through the opening in the plate.

8. The combination of claim 7, wherein said masking means is constituted of transparent material.

9. Scanning apparatus comprising a horizontally disposed base plate having a circular opening therein, a horizontally disposed circular scanning plate mounted within the opening in the base plate for rotation about a vertical axis, said scanning plate having a central opening therethrough, an electrically nonconductive mask underlying the base plate and the scanning plate, said mask being secured to the base plate and having an opening therethrough that is in registry with and smaller than the opening in the scanning plate, a carrier block, means fixed to the scanning plate for supporting and guiding horizontal reciprocating motion of the carrier block, an elongated, horizontally disposed carrier arm mounted upon the carrier block for longitudinal reciprocation, said arm being disposed at a right angle to the direction of the reciprocating motion of the carrier block, means supported upon the scanning plate including a reversing lead screw for reciprocating the carrier block between limiting positions, spring means urging longitudinal movement of the carrier arm in one direction, pawl and ratchet means including ratchet teeth on the carrier arm normally preventing such longitudinal movement of the carrier arm, said spring means and said last means also being effective upon each occurrence of the carrier block reaching either of said limiting positions to cause the carrier arm to move longitudinally a fixed distance, a pair of electrodes carried by and depending from the carrier arm so as to extend through the opening in the scanning plate, said electrodes being spaced longitudinally of the carrier arm, and electrical means for counting occurrences of the electrodes being connected by an electrtical conductor.

10. The combination of claim 9, wherein the portion of the mask adjacent the opening therein is transparent.

11. The combination of claim 9, wherein the portion of the mask immediately adjacent the opening therein is beveled, said electrodes having sufficient vertical freedom of movement to pass over the beveled portion of and on to the mask.

12. The combination of claim 9, wherein means is provided for controlling the rate of rotation of the level wind shaft.

13. The combination of claim 9 including means for securing the base plate and the scanning plate in a selected azimuthal relation to each other.

References Cited in the file of this patent

UNITED STATES PATENTS

| | | |
|---|---|---|
| 2,265,418 | Brand | Dec. 9, 1941 |
| 2,500,935 | Dietz | Mar. 21, 1950 |
| 2,597,866 | Gridley | May 27, 1952 |
| 2,748,487 | Hans-Gerhard Zimmermann | June 5, 1956 |

FOREIGN PATENTS

| | | |
|---|---|---|
| 292,449 | Switzerland | Nov. 2, 1953 |